(12) United States Patent
Hong et al.

(10) Patent No.: US 10,425,807 B2
(45) Date of Patent: Sep. 24, 2019

(54) METHOD AND APPARATUS FOR CONTROLLING INTERFACE DISPLAY

(71) Applicant: YOUKU INTERNET TECHNOLOGY (BEIJING) CO., LTD., Beijing (CN)

(72) Inventors: Lulu Hong, Beijing (CN); Dongdong Zhao, Beijing (CN); Wei Ge, Beijing (CN); Sibin Gu, Beijing (CN); Weidong Yang, Beijing (CN); Baiyu Pan, Beijing (CN); Qing Xiang, Beijing (CN)

(73) Assignee: Youku Internet Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/892,519

(22) Filed: Feb. 9, 2018

(65) Prior Publication Data

US 2018/0234841 A1    Aug. 16, 2018

(30) Foreign Application Priority Data

Feb. 10, 2017    (CN) .......................... 2017 1 0074118

(51) Int. Cl.
*H04M 1/00*    (2006.01)
*H04W 12/02*    (2009.01)
(Continued)

(52) U.S. Cl.
CPC .......... *H04W 12/02* (2013.01); *G06F 3/0488* (2013.01); *G06F 3/04842* (2013.01);
(Continued)

(58) Field of Classification Search
CPC .. G06F 3/04883; G06F 3/0488; G06F 3/0481; G06F 3/011; G06F 3/0482; G06F 3/0487; G06F 3/04842; G06F 3/017; H04W 12/02; H04N 1/00408; H04N 1/00411; H04N 1/00413

(Continued)

(56) References Cited

U.S. PATENT DOCUMENTS

| 2004/0255304 | A1* | 12/2004 | Ishikawa | G06Q 10/107 719/318 |
| 2013/0036363 | A1* | 2/2013 | Johnson | G06F 21/6245 715/738 |
| 2014/0198055 | A1* | 7/2014 | Barkway | G06F 3/04883 345/173 |

FOREIGN PATENT DOCUMENTS

| CN | 102529979 | 7/2012 |
| CN | 104158947 | 11/2014 |

(Continued)

*Primary Examiner* — Ronald Eisner
(74) *Attorney, Agent, or Firm* — Occhiuti & Rohlicek LLP

(57) ABSTRACT

The present disclosure relates to a method and apparatus for controlling interface display. The method includes: determining whether or not a first interface switching condition is satisfied in a case where a first display interface of an application is being displayed; and switching the first display interface being displayed at present to a second display interface of the application in a case where the first interface switching condition is satisfied, wherein the first display interface is associated with authentic user information, and the second display interface is associated with virtual user information. Examples of the present disclosure enable quick interface switching and thus provide the user with more convenience and improved experience in using the terminal device.

21 Claims, 6 Drawing Sheets

(51) Int. Cl.
*G06F 3/0484* (2013.01)
*G06F 3/0488* (2013.01)
*G06F 9/451* (2018.01)
*G06F 21/31* (2013.01)

(52) U.S. Cl.
CPC ............ *G06F 9/451* (2018.02); *G06F 21/316* (2013.01); *G06F 2221/2137* (2013.01)

(58) Field of Classification Search
USPC ................................................ 455/410, 411
See application file for complete search history.

(56) References Cited

FOREIGN PATENT DOCUMENTS

| CN | 104866198 | 8/2015 |
|---|---|---|
| CN | 105094898 | 11/2015 |
| CN | 105930701 | 9/2016 |
| CN | 105955684 | 9/2016 |
| CN | 106896983 | 6/2017 |

* cited by examiner

METHOD AND APPARATUS FOR CONTROLLING INTERFACE DISPLAY

CROSS-REFERENCE TO RELATED APPLICATION

The present application is based upon and claims the benefit of a priority of Chinese patent application No. 201710074118.2, filed on Feb. 10, 2017, the entirety of which is incorporated herein by reference.

TECHNICAL FIELD

The present application relates to computer technologies, and in particular, to a method and apparatus for controlling interface display.

BACKGROUND

As terminal devices (e.g., smartphones) are becoming popular, applications in them are also becoming increasingly varied and plentiful. Many users like to interact with terminal devices by, for example, viewing a webpage or playing a video, with a browser, a player, or a reading-related application, among other things. Users are more and more aware of the importance of protecting their privacy during interacting with terminal devices, especially when their demands are multifaceted and personal. For instance, when a user is working or doing some other secret things on a terminal device, the user does not hope for another person (e.g., one of his colleagues, or his child) who suddenly appears before him to see what he is watching on the terminal device.

In the relevant technologies, it is usual to provide a terminal device with a privacy screen or to stick a privacy film on the screen of a terminal device. Also, there are other peep-proof methods, including quick exit, page minimization and page closing. However, when a privacy screen or privacy film is employed, the user may find, besides the unhidden sound, that the screen turns darker, because a privacy screen or privacy film achieves the peep-proof purpose by shielding off light in certain directions. In addition, the thickness of a privacy film might sometimes make the touch screen insensitive. In the case of quick exit, page minimization, or page closing, it may take the user too long a time to disappear the viewed page quickly enough in an unexpected situation, and it may also be inconvenient for the user to return to the previously viewed page in order to continue the previous work or operation.

SUMMARY

In one aspect, in general, the present disclosure describes a method and apparatus for controlling interface display, such as controlling the displaying of an interface (e.g., for presenting and/or receiving information to/from a user of an application) that is configured to be rendered on a display (also called a "display interface"), where the display upon which the display interface is rendered can include any type of circuitry and/or instructions configured to render on an output interface such as a screen of a terminal device. The method and apparatus are capable of quickly switching display interfaces.

In another aspect, in general, the present disclosure describes a method for controlling interface display, comprising:

determining whether or not a first interface switching condition is satisfied in a case where a first display interface of an application is being displayed; and switching the first display interface being displayed at present to a second display interface of the application in a case where the first interface switching condition is satisfied, wherein the first display interface is associated with authentic user information, and the second display interface is associated with virtual user information.

In still another aspect, in general, the present disclosure describes an apparatus for controlling interface display, comprising:

a first condition determinator configured to determine whether or not a first interface switching condition is satisfied in a case where a first display interface of an application is being displayed; and a first interface switcher configured to switch the first display interface being displayed at present to a second display interface in a case where the first interface switching condition is satisfied, wherein the first display interface is associated with authentic user information, and the second display interface is associated with virtual user information.

In yet another aspect, in general, the present disclosure describes an apparatus for controlling interface display, comprising:

a processor; and a memory storing computer-readable instructions that, when executed by the processor, cause the processor to:

determine whether or not a first interface switching condition is satisfied in a case where a first display interface of an application is being displayed; and switch the first display interface being displayed at present to a second display interface of the application in a case where the first interface switching condition is satisfied, wherein the first display interface is associated with authentic user information, and the second display interface is associated with virtual user information.

Aspects may have one or more of the following advantages. The method and apparatus for controlling interface display according to examples of the present disclosure enable quick interface switching and thus provide the user with more convenience and improved experience in using the terminal device.

Additional features and aspects of the present disclosure will become apparent from the following description of exemplary examples with reference to the attached drawings.

BRIEF DESCRIPTION OF THE DRAWINGS

The drawings, which are incorporated in and constitute part of the specification, together with the description, illustrate exemplary examples, features and aspects of the present disclosure and serve to explain the principles of the present disclosure.

DETAILED DESCRIPTION

Figure 1:
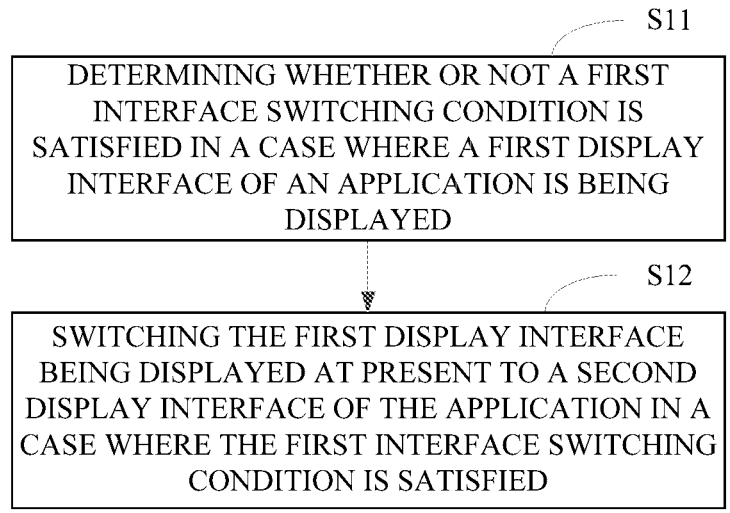
FIG. 1 is a flowchart showing a method for controlling interface display according to an example of the present disclosure.

Various exemplary examples, features and aspects of the present disclosure will be described in detail with reference to the drawings. The same reference numerals in the drawings represent parts having the same or similar functions. Although various aspects of the examples are shown in the drawings, it is unnecessary to proportionally draw the drawings unless otherwise specified.

Herein the term "exemplary" means "used as an instance or example, or explanatory". An "exemplary" example given here is not necessarily construed as being superior to or better than other examples.

Numerous details are given in the following examples for the purpose of better explaining the present disclosure. It should be understood by those skilled in the art that the present disclosure can still be realized even without some of those details. In some of the examples, methods, means, units and circuits that are well known to those skilled in the art are not described in detail so that the principles of the present disclosure become apparent.

FIG. 1 is a flowchart showing a method for controlling interface display according to an example of the present disclosure. The method is applicable to terminal devices such as smartphones and computers. As shown in FIG. 1, the method for controlling interface display of this example comprises:

Step S11 of determining whether or not a first interface switching condition is satisfied in a case where a first display interface of an application is being displayed; and Step S12 of switching the first display interface being displayed at present to a second display interface in a case where the first interface switching condition is satisfied, wherein the first display interface is associated with authentic user information, and the second display interface is associated with virtual user information.

This example is capable of determining whether or not a first interface switching condition is satisfied when a first display interface that is associated with authentic user information is being displayed, and switching the first display interface to a second display interface that is associated with virtual user information when the first interface switching condition is satisfied, so as to enable quick interface switching and thus provide the user with more convenience and improved experience in using the terminal device.

This example not only makes it unnecessary to transform the exterior of a terminal device, and makes the operation easily, but also has no influence on the work or video that the user has not finished, thereby meeting different requirements of modern people and protecting their privacy.

For instance, a user is using a terminal device (e.g., a smartphone) to view an interface of an application, e.g., a video headline provided by a video application. At this time, the terminal device can present the user with a first display interface (e.g., a video headline page). The first display interface is associated with authentic user information. The authentic user information may be any form of authentic information related to the user, including user browsing behavior information, a user portrait, user identity information, a content set by the user for the first display interface, and a searching keyword input by the user. The first display interface may be, for example, generated according to such user authentic information as the user's browsing history, the user's portrait and/or contents range preset by the user so as to meet the user's personalized browsing needs. Take a user who often watches violent movies as an example, will leave relevant browsing behavior information, the server may provide the user with video headline pages featuring violence on the basis of the browsing behavior information the user leaves.

In a possible embodiment, a second display interface associated with virtual user information may be preset in the terminal device. The second display interface may correspond to the first display interface. For instance, both of the first and second display interfaces may be video headline pages. The first display interface may contain private information such as an image of a sexy hostess or a bloody image. Information of that kind is perhaps not suitable for others (e.g., the user's colleagues or children who come to him), so the user would not like them to see it. In this case, the system may automatically preset or the user may preset by himself one or more second display interfaces associated with virtual user information that is distinguishable from the authentic user information. The virtual user information may be any form of virtual information, e.g., "disguised" user information obtained by removing some parameters from the authentic user information, or "disguised" user information preset by the user to limit what will be displayed. The second display interface is generated according to the virtual user information may not contain private information such as an image of a sexy hostess or a bloody image. The present disclosure is not meant to place a restriction on how to set the second display interface. For instance, the user may set by himself the virtual user information as the keyword "English learning". Then, the server may generate a second display interface that recommends English learning videos. To take another example, the user may set by himself the virtual user information as "masking sexy and bloody images". Then, the server may generate a second display interface by masking sexy and bloody images in the first display interface.

In a possible embodiment, when the terminal device is showing a first display interface, a determination can be made as to whether a first interface switching condition is satisfied. The first interface switching condition may be a preset one, such as an operation performed by the user on the terminal device to enable quick interface switching. The operation may be, for example, single key tapping, sliding a finger on the screen, sliding a finger on an icon, or any other operation preset by the user. When the user performs one of the above manual operations, it is actually determined that a first interface switching condition is satisfied, and consequently, the first display interface is switched to a second display interface.

In a possible embodiment, the first interface switching condition may be a location of the terminal device. For example, the user may set "work unit" as the first interface switching condition and set a second display interface corresponding to "work unit". In this case, when the terminal device is located in "work unit", it is actually determined that the first interface switching condition is satisfied, and consequently, the first display interface is switched to a second display interface that is suitable for the user to view in his work unit.

In a possible embodiment, the first interface switching condition may be a predetermined time period such as 21:00-23:00. And the user may set a second display interface corresponding to the predetermined time period. In this case, when a time falls within the predetermined time period, it is actually determined that the first interface switching condition is satisfied, and consequently, the first display interface is switched to a second display interface that is suitable for the user to view during that time period. The present disclosure is not meant to place a restriction on how to set the first display interface.

In a possible embodiment, a second display interface may be of the same or similar layout as a first display interface. And switching from a first display interface to a second display interface may be made in a smooth way so that the switching becomes natural and achieves the purpose of protecting the first display interface. The "authentic" first display interface and the "virtual" second display interface are applicable not only to an application scenario such as a video headline, a news headline or an operating system headline, but also to a chat history, a call history, an album or the like, or a display interface of the whole operating system alike.

Figure 2:
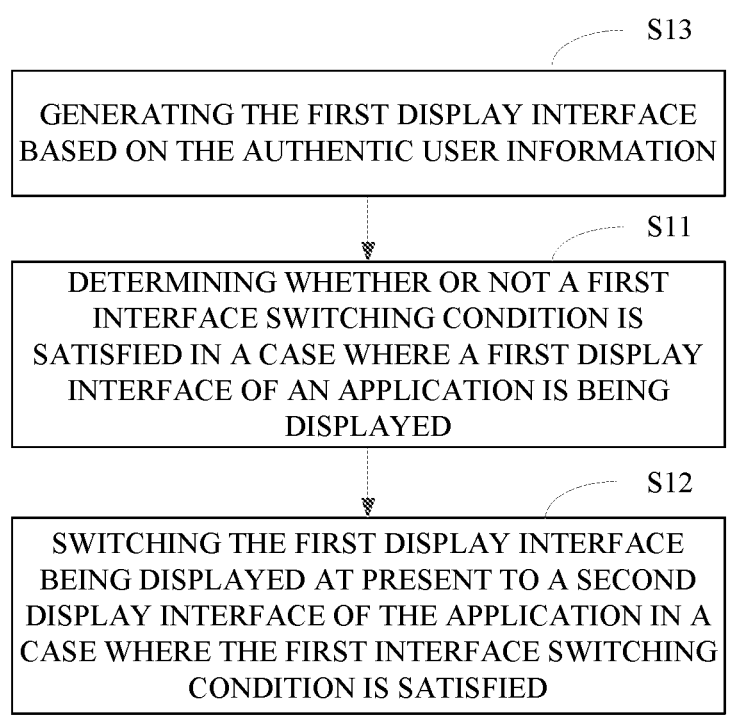
FIG. 2 is a flowchart showing a method for controlling interface display according to an example of the present disclosure.

FIG. 2 is a flowchart showing a method for controlling interface display according to an example of the present disclosure. As shown in FIG. 2, the method further comprises:

Step S13 of generating the first display interface based on the authentic user information, wherein the authentic user information includes one or more of the followings: user browsing behavior information, user identity information, a content set by a user for the first display interface, and a searching keyword input by a user.

The authentic user information may be, for example, user's real browsing behavior information, which decides an authentic interface recommendation strategy suitable for the user. To take a video application for example, if the user often watches funny videos, then the interface recommendation strategy may involve more funny videos. User identity information may also decide an interface recommendation strategy for the user. If the user is, for example, a female, then the interface recommendation strategy may involve more life videos. The authentic interface recommendation strategy may be set by the user, or decided by search keywords of the user, so as to meet the user's real needs. Since the authentic interface recommendation strategy for the user is decided by authentic user information, the first display interface generated accordingly contains various kinds of information (e.g., a video) that interest the user.

In a possible embodiment, the first display interface may be any kind of display interface such as a mobile phone page, a PC page and a web page. For example, the first display interface may be a desktop theme of a mobile phone or PC, and it may be a real personalized thematic interface that is generated on the basis of the authentic user information. The thematic interface may appear fresh/warm in the case of a female user, and may appear profound/cold in the case of a business user. The first display interface may be, for example, a web page, and it may be a real personalized web page that is adapted to the authentic user information. In the case of a scientific researcher, the web page may show more technological websites/news, as a result of his browsing habit. The present disclosure is not meant to place any restriction on the type of the first display interface.

By this means, generating the first display interface based on authentic user information would provide the user with more convenience in using the terminal device.

Figure 3:
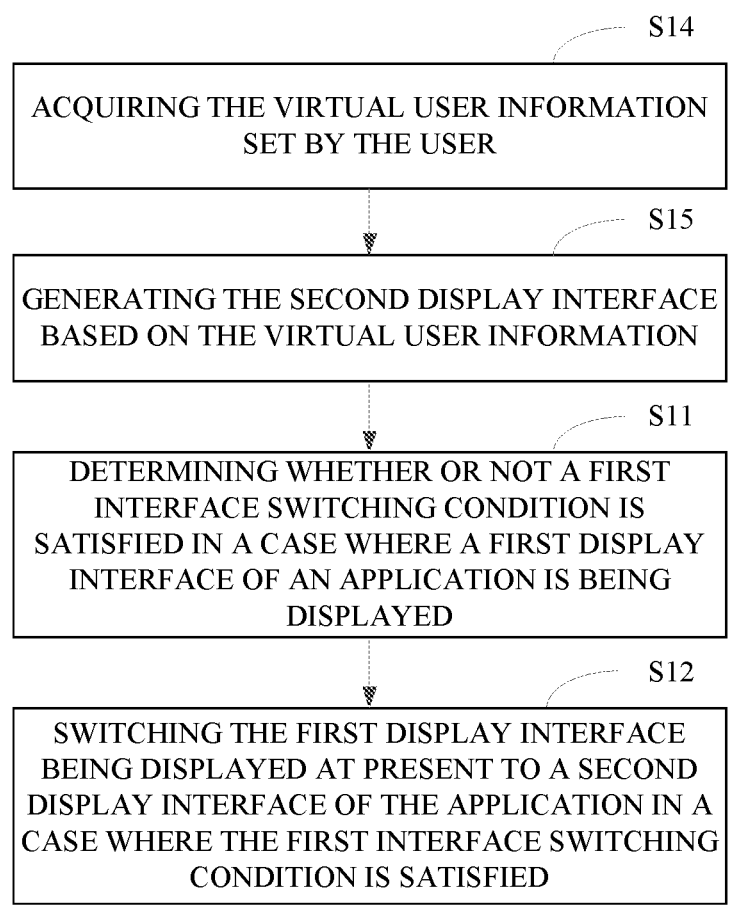
FIG. 3 is a flowchart showing a method for controlling interface display according to an example of the present disclosure.

FIG. 3 is a flowchart showing a method for controlling interface display according to an example of the present disclosure. As shown in FIG. 3, the method further comprises:

Step S14 of acquiring the virtual user information set by the user; and

Step S15 of generating the second display interface based on the virtual user information.

The virtual user information may be, for example, a user virtual browsing tendency that the user hopes others (e.g., his families and colleagues) to see, which decides a virtual interface recommendation strategy suitable for the user. To take a video application for example, if the user does not hope others to see sexy/bloody images (videos) on the display interface of the application but hopes them to see only life/funny videos on it, then the user may first preset virtual user information in the application, such as removing some kinds of videos from the interface, or recommending only some kinds of videos. Since the virtual interface recommendation strategy for the user is decided by virtual user information, the second display interface generated accordingly contains various kinds of browsing information (e.g., a video) that the user hopes others (e.g., his colleagues and families) to see.

In a possible embodiment, the virtual user information may be "disguised" user information obtained by removing some parameters from the authentic user information. To take a video application for example, if the user does not hope others to see sexy/bloody images (videos) on the display interface of the application, the user may preset the virtual user information as, for example, "masking sexy/bloody images". Then, the server may generate a second display interface by masking sexy and bloody images in the first display interface accordingly. In this way, when the first display interface is switched to the second display interface, others will not see upsetting images (videos).

In a possible embodiment, the virtual user information may be "disguised" information that the user presets to limit range of contents to be displayed. To take a video application for example, if the user hopes others to see only one or several types of videos on the display interface of the application, then the user may preset in the application the virtual user information as the keyword "English learning", for example. Then, the server may generate a second display interface that recommends English learning videos accordingly. In this way, when the first display interface is switched to the second display interface, others will see merely contents that the user wishes them to see.

By this means, generating the second display interface based on virtual user information set by the user provides the user with more convenience.

In a possible embodiment, step S11 includes determining whether one or more of the following satisfies the first interface switching condition:

a location of the terminal device, a current time, and an operation performed by the user on the terminal device.

To take an example, determining whether or not a first interface switching condition is satisfied in step S11 may be performed in various ways. The first interface switching condition may be an operation performed by the user on the terminal device to enable quick interface switching, such as single key tapping, sliding a finger on the screen, or sliding a finger on an icon. When the user performs above manual operations, it is actually determined that the first interface switching condition is satisfied, and consequently, the first display interface is switched to a second display interface.

In a possible embodiment, the first interface switching condition may be a current location of the terminal device. For example, the user may set "work unit" and/or "home" as the first interface switching condition, and set a second display interface corresponding to "work unit" and another second display interface corresponding to "home". When the current location of the terminal device is "work unit", it is determined that the first interface switching condition is satisfied, and consequently, the first display interface is switched to a second display interface that is suitable for the user to view in his work unit. In this way, one or more second display interfaces can be set for different locations, and thus the user can view different interfaces at different locations or the user can let people at different locations view different interfaces.

In a possible embodiment, the first interface switching condition may be a predetermined time period such as 21:00-23:00. And the user may set a second display interface corresponding to the predetermined time period. In this case, when a time falls within the predetermined time period, it is determined that the first interface switching condition is satisfied, and consequently, the first display interface is switched to a second display interface that is suitable for the user to view during that time period. For example, if every day the user has a rest and plays during the time period 21:00-23:00, the display interface of the application will be switched to a second display interface associated with entertainment. In this way, one or more second display interfaces can be set for different time periods, and thus the user can view different interfaces during different time periods or the user can let others view different interfaces during different time periods.

By this means, determining whether or not a first interface switching condition is satisfied based on a location of a terminal device, a current time, and an operation performed by the user on the terminal device provides the user with more flexibility and convenience in using the terminal device.

Figure 4:
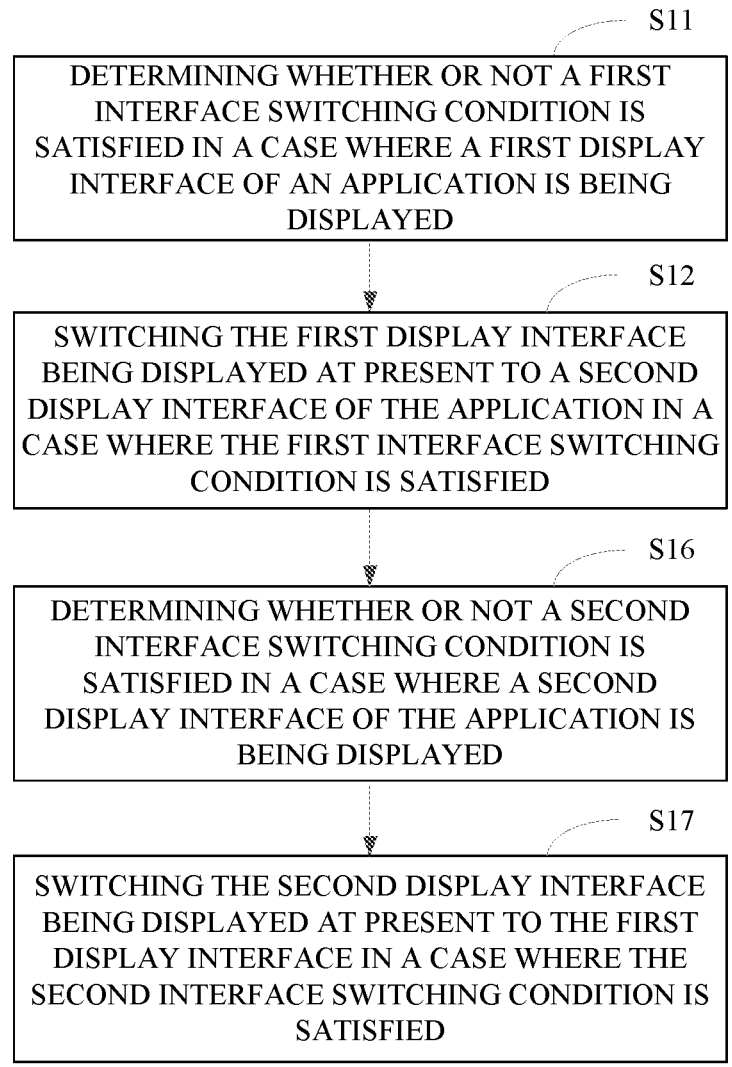
FIG. 4 is a flowchart showing a method for controlling interface display according to an example of the present disclosure.

FIG. 4 is a flowchart showing a method for controlling interface display according to an example of the present disclosure. As shown in FIG. 4, the method further comprises:

Step S16 of determining whether or not a second interface switching condition is satisfied in a case where a second display interface of the application is being displayed; and Step S17 of switching the second display interface which is displaying at the present to the first display interface in a case where the second interface switching condition is satisfied.

To take an example, when the terminal device is showing a second display interface, it is possible that the others have left the user, the current location of the terminal device has changed, or the current time is changed, and now it is time to determine whether or not a second interface switching condition is satisfied. For example, when the others have left the user and it is determined that the second interface switching condition is satisfied, the second display interface is switched to the first display interface through single key tapping, sliding a finger on the screen, sliding a finger on an icon, or any other operation preset by the user. For either or both of the first interface switching condition and the second interface switching condition, the system may set a particular operation, selected based on user input from a group of multiple possible operations, to be used for determining whether or not the switching condition is satisfied. When the current location of the terminal device has changed or the current time is changed, a determination is made as to whether a second interface switching condition is satisfied on the basis of a preset condition. Switching the second display interface to the first display interface when a second interface switching condition is satisfied allows the user to continue his real browsing.

By this means, it provides the user with more flexibility and convenience in using the terminal device.

Figure 7:
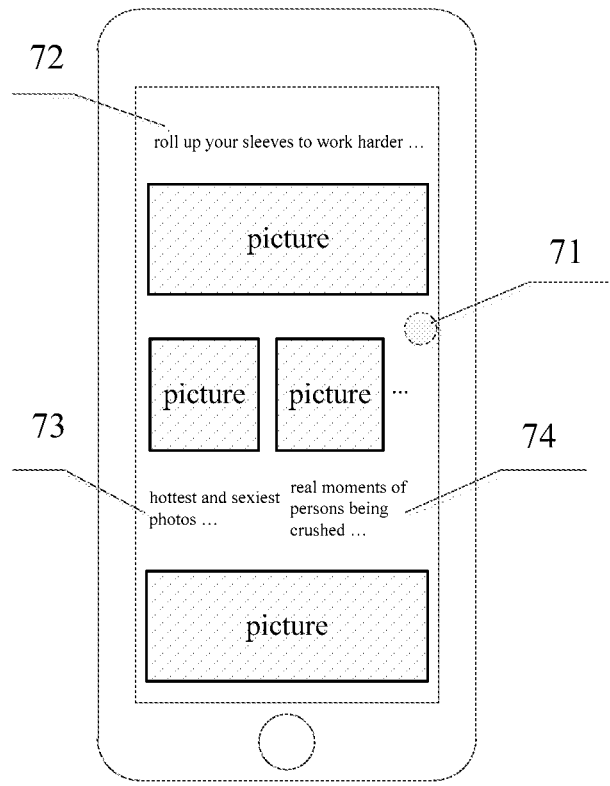
FIG. 7 is a schematic diagram showing a first display interface of a method for controlling interface display according to an example of the present disclosure in an application scenario.

FIG. 7 is a schematic diagram showing a first display interface of a method for controlling interface display according to an example of the present disclosure in an application scenario. In the possible embodiment shown in FIG. 7, the screen of the terminal device shows a first display interface associated with authentic user information of a user, on which there are recommended messages 72, 73 and 74 that are generated on the basis of the authentic user information in order for the user to view. The message 72 may be a political one, and the messages 73 and 74 may contain sexy/bloody images. On the first display interface there may be a switching icon 71, which the user taps when he finds another person (one of his colleagues or one of his family) who might see the screen, so as to switch the first display interface to a second display interface.

Figure 8:
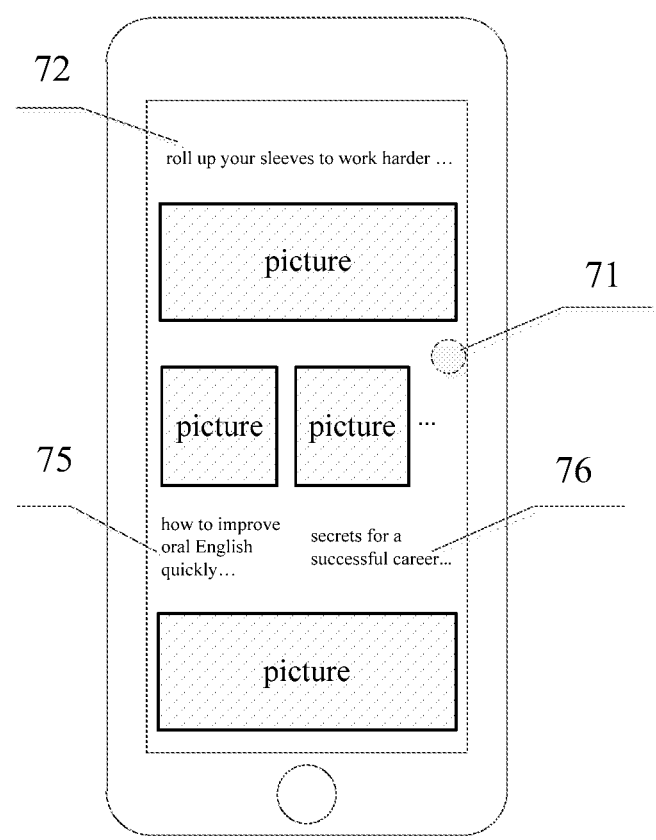
FIG. 8 is a schematic diagram showing a second display interface of a method for controlling interface display according to an example of the present disclosure in an application scenario.

FIG. 8 is a schematic diagram showing a second display interface of a method for controlling interface display according to an example of the present disclosure in an application scenario. In the possible embodiment shown in FIG. 8, the screen of the terminal device shows a second display interface associated with virtual user information of the user, on which there are recommended messages 72, 75 and 76 that are generated on the basis of "disguised" user information that is set by the user in order for him to view. The message 72 may be a political one, and the messages 75 and 76 may be of learning/inspirational type. Such a second display interface only shows things that the user hopes others to see. On the second display interface there may be a switching icon 71, which the user taps when another person (one of his colleagues or one of his family) has left him, so as to switch the second display interface being displayed at present to the first display interface. The location of the switching icon 71 on the screen of the terminal device can be substantially identical for both the first display interface and the second display interface, as shown in FIG. 7 and FIG. 8. In general, the location on the screen of any user interactions with the screen of the terminal device for satisfying the first and second interface switching conditions, respectively, can be substantially identical for both the first display interface and the second display interface. Also, the location of the switching icon 71 can be positioned on the screen of the terminal device in proximity to an edge of the first or second display interface, as shown in FIG. 7 and FIG. 8.

Figure 5:
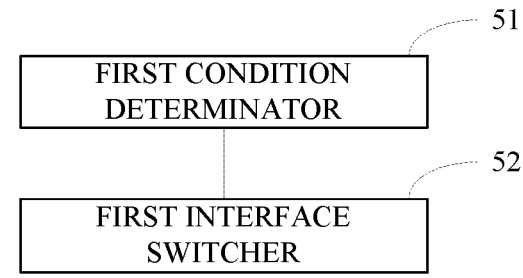
FIG. 5 is a block diagram showing an apparatus for controlling interface display according to an example of the present disclosure.

FIG. 5 is a block diagram showing an apparatus for controlling interface display according to an example of the present disclosure. As shown in FIG. 5, the apparatus comprises a first condition determinator 51 and a first interface switcher 52.

The first condition determinator 51 is configured to determine whether or not a first interface switching condition is satisfied in a case where a first display interface of an application is being displayed.

The first interface switcher 52 is configured to switch the first display interface being displayed at present to a second display interface in a case where the first interface switching condition is satisfied.

The first display interface is associated with authentic user information, and the first display interface is associated with virtual user information.

Figure 6:
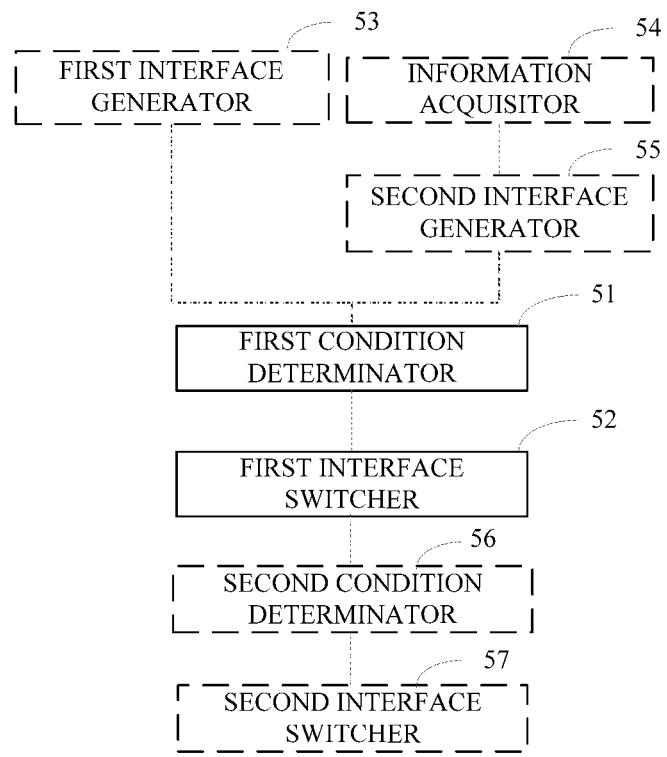
FIG. 6 is a block diagram showing an apparatus for controlling interface display according to an example of the present disclosure.

FIG. 6 is a block diagram showing an apparatus for controlling interface display according to an example of the present disclosure. As shown in FIG. 6, the apparatus further comprises:

an information acquisitor 54 configured to acquire the virtual user information set by the user; and a second interface generator 55 configured to generate the second display interface based on the virtual user information.

As shown in FIG. 6, a possible embodiment of the apparatus further comprises:

a first interface generator 53 configured to generate the first display interface based on the authentic user information. The authentic user information includes one or more of the following: user browsing behavior information, user identity information, a content set by a user for the first display interface, and a search keyword input by a user.

In a possible embodiment of the apparatus, determining whether or not a first interface switching condition is satisfied includes determining whether one or more of the following satisfies the first interface switching condition:

a location of the terminal device, a current time, and an operation performed by the user on the terminal device.

As shown in FIG. 6, a possible embodiment of the apparatus further comprises:

a second condition determinator 56 configured to determine whether or not a second interface switching condition is satisfied in a case where the second display interface of the application is being displayed; and a second interface switcher 57 configured to switch the second display interface being displayed at present to the first display interface in a case where the second interface switching condition is satisfied.

The examples of the present disclosure are capable of determining whether or not a first interface switching condition is satisfied when a first display interface that is associated with authentic user information is being displayed, and switching the first display interface to a second display interface that is associated with virtual user information when the first interface switching condition is satisfied, so as to enable quick interface switching and thus provide the user with more convenience and improved experience in the using the terminal device.

Figure 9:
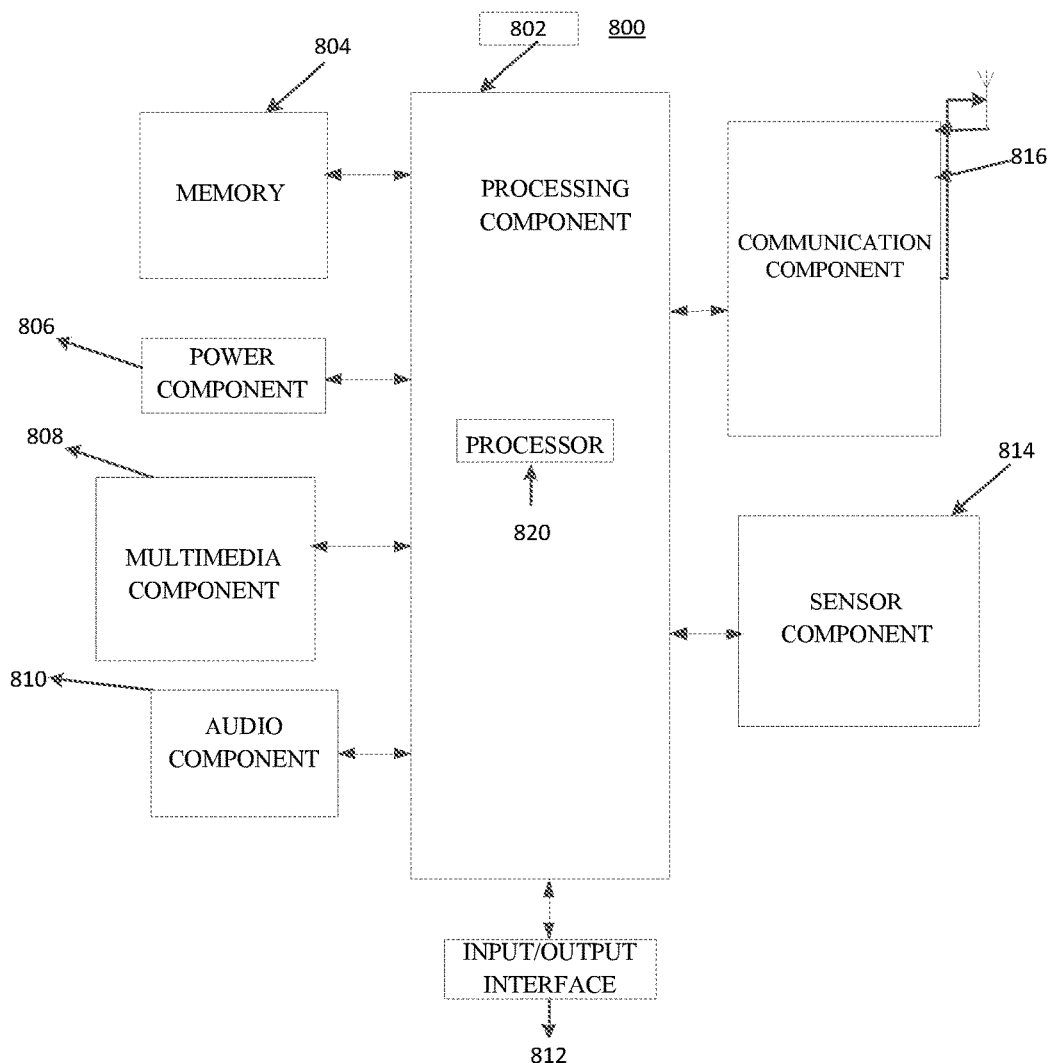
FIG. 9 is a block diagram showing an apparatus for controlling interface display according to an example of the present disclosure.

FIG. 9 is a block diagram showing an apparatus 8 for controlling interface display according to an example of the present disclosure. Apparatus 800 may be a mobile phone, a computer, a digital broadcasting terminal, a messaging device, a game console, a tablet device, medical equipment, fitness equipment, a personal digital assistant, or the like.

Referring to FIG. 9, apparatus 800 includes one or more of the following components: a processing component 802, a memory 804, a power component 806, a multimedia component 808, an audio component 810, an input/output (I/O) interface 812, a sensor component 814, and a communication component 816.

Processing component 802 is configured to control overall operations of apparatus 800, such as the operations associated with display, telephone calls, data communications, camera operations, and recording operations. Processing component 802 can include one or more processors 820 configured to execute instructions to perform all or part of the steps included in the above-described methods. In some embodiments, processing component 802 may include one or more modules configured to facilitate the interaction between the processing component 802 and other components. For example, processing component 802 may include a multimedia module configured to facilitate the interaction between multimedia component 808 and processing component 802. Any of the other components can be used as the processing component 802 performs all or part of the steps included in the above-described methods. For example, components that are configured to receive input can be used to enable a preset operation to be performed as either or both of the first and second interface switching conditions.

Memory 804 is configured to store various types of data to support the operation of apparatus 800. Examples of such data include instructions for any applications or methods operated on or performed by apparatus 800, contact data, phonebook data, messages, pictures, video, etc. Memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Power component 806 is configured to provide power to various components of apparatus 800. Power component 806 may include a power management system, one or more power sources, and any other components associated with the generation, management, and distribution of power in apparatus 800.

Multimedia component 808 includes a screen providing an output interface between apparatus 800 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors configured to sense touches, swipes, and other gestures on the touch panel, which may be used, for example, for a preset operation performed as either or both of the first and second interface switching conditions. The touch sensors may sense not only a boundary of a touch or swipe action, but also a period of time and a pressure associated with the touch or swipe action. In some embodiments, multimedia component 808 may include a front camera and/or a rear camera. The front camera and the rear camera may receive an external multimedia datum while apparatus 800 is in an operation mode, such as a photographing mode or a video mode. Each of the front camera and the rear camera may be a fixed optical lens system or may have focus and/or optical zoom capabilities.

Audio component 810 is configured to output and/or input audio signals. For example, audio component 810 may include a microphone configured to receive an external audio signal when apparatus 800 is in an operation mode, such as a call mode, a recording mode, and a voice recognition mode. The input audio signals, and voice recognition of such signals, may be used, for example, for a preset operation performed as either or both of the first and second interface switching conditions. For example, a particular predetermined word, or sequence of words, to be recognized can be selected as part of configuring a preset operation. The received audio signal may be further stored in memory 804 or transmitted via communication component 816. In some embodiments, audio component 810 further includes a speaker configured to output audio signals.

I/O interface 812 is configured to provide an interface between processing component 802 and peripheral interface modules, such as a keyboard, a click wheel, buttons, and the like. The buttons may include, but are not limited to, a home button, a volume button, a starting button, and a locking button.

Sensor component 814 may include one or more sensors configured to provide status assessments of various aspects of apparatus 800. For example, sensor component 814 may detect at least one of an open/closed status of apparatus 800, relative positioning of components, e.g., the display and the keypad, of apparatus 800, a change in position of apparatus 800 or a component of apparatus 800, a presence or absence of user contact with apparatus 800, an orientation or an acceleration/deceleration of apparatus 800, and a change in temperature of apparatus 800. Sensor component 814 may include a proximity sensor configured to detect the presence of nearby objects without any physical contact. Sensor component 814 may also include a light sensor, such as a CMOS or CCD image sensor, for use in imaging applications. In some embodiments, sensor component 814 may also include an accelerometer sensor, a gyroscope sensor, a magnetic sensor, a pressure sensor, or a temperature sensor.

Communication component 816 is configured to facilitate wired or wireless communication between apparatus 800 and other devices. Apparatus 800 can access a wireless network based on a communication standard, such as WiFi, 2G or 3G or a combination thereof. In some embodiments, communication component 816 receives a broadcast signal or broadcast associated information from an external broadcast management system via a broadcast channel. In some embodiments, communication component 816 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or any other suitable technologies.

In some embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as those included in memory 804, executable by processor 820 of apparatus 800, for performing the above-described methods.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions executed on the computer, other programmable apparatus, or other device implement the functions/acts specified in the flowchart and/or block diagram block or blocks.

The flowcharts and block diagrams in the attached drawings illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

There is a description of the examples of the present disclosure hereinbefore. The description is not exhaustive but illustrative. The present disclosure is not limited to those examples. Modifications and changes of the present disclosure that are made without departing from the spirit and scope the present disclosure are obvious to those skilled in the art. The terms in this specification have been chosen for the purpose of best explaining the principles of the examples, practical application or technical improvement on the technology in the market, or for the purpose of enabling those skilled in the art to understand those examples.

What is claimed is:

1. A method for controlling interface display, said method comprising:
    obtaining, by an application, authentic information about a user of the application,
    generating, by the application, a first display interface that is associated with the authentic information,
    generating, by the application, by removing or modifying parameters from the authentic information, virtual information about the user of the application,
    generating, by the application, a second display interface that is associated with the virtual information,
    determining, by the application, while the first display interface is being displayed, whether or not a first interface switching condition is satisfied,
    maintaining, by the application, while the first switching condition is not satisfied, the first display interface being displayed, and
    switching, by the application, when the first switching condition is satisfied, the first display interface being displayed to the second display interface.

2. The method according to claim 1, further comprising: acquiring the virtual user information set by a user; and generating the second display interface based on the virtual user information.

3. The method according to claim 2, wherein generating the second display interface based on the virtual user information includes generating a layout of the second display interface based on a layout of the first display interface.

4. The method according to claim 1, further comprising: generating the first display interface based on the authentic user information, wherein the authentic user information comprises one or more of user browsing behavior information, user identity information, a content set by a user for the first display interface, or a search keyword input by a user.

5. The method according to claim 1, wherein determining whether or not the first interface switching condition is satisfied comprises determining whether one or more of a location of a terminal device, a current time, or an operation performed by a user on the terminal device satisfy the first interface switching condition.

6. The method according to claim 5, wherein there are a plurality of different display interfaces associated with virtual user information, and the second display interface is selected from among the plurality of different display interfaces based on at least one of: (1) the location of the terminal device compared to one or more predetermined locations, or (2) the current time compared to one or more predetermined time periods.

7. The method according to claim 1, further comprising: determining whether or not a second interface switching condition is satisfied in a case where the second display interface of the application is being displayed; and switching the second display interface being displayed at present to the first display interface of the application in a case where the second interface switching condition is satisfied.

8. The method according to claim 7, wherein a first user interaction is used for determining whether or not the first interface switching condition is satisfied and a second user interaction is used for determining whether or not the second interface switching condition is satisfied, and a location of the first user interaction on a screen of a terminal device is substantially identical to a location of the second user interaction on the screen of the terminal device.

9. The method according to claim 1, wherein an operation that receives user input is used for determining whether or not the first interface switching condition is satisfied, and the operation includes at least one of: sensing a gesture input associated with predetermined icon in proximity to an edge of the first display interface, or recognizing a voice input.

10. The method according to claim 1, further comprising: receiving input a first operation from a group of multiple possible operations, and setting the first operation to be used for determining whether or not the first interface switching condition is satisfied.

11. An apparatus for controlling an interface display, said apparatus comprising:
a first condition determinator that executes on at least one processor, said first condition determinator being configured to determine whether or not a first interface switching condition is satisfied while a first display interface of an application is being displayed, said first display interface being associated with authentic information about a user of said application, said authentic information having been obtained by said application and said first display interface having been generated by said application; and
a first interface switcher that executes on at least one processor, the first interface switcher being configured to switch the first display interface to a second display interface and to do so when the first interface switching condition is satisfied, said second display interface being associated with virtual information about said user of said application, said virtual information having been generated by said application by removal or modification of parameters from said authentic information,
wherein, in the absence of satisfaction of said first switching condition, said application maintains display of said first display interface.

12. The apparatus according to claim 11, further comprising: an information acquisitor, executing on at least one processor, configured to acquire the virtual user information set by a user; and a second interface generator, executing on at least one processor, configured to generate the second display interface based on the virtual user information.

13. The apparatus according to claim 12, wherein generating the second display interface based on the virtual user information includes generating a layout of the second display interface based on a layout of the first display interface.

14. The apparatus according to claim 11, further comprising: a first interface generator, executing on at least one processor, configured to generate the first display interface based on the authentic user information, wherein the authentic user information comprises one or more of user browsing behavior information, user identity information, a content set by a user for the first display interface, or a search keyword input by a user.

15. The apparatus according to claim 11, wherein the first condition determinator is configured to determine whether or not the first interface switching condition is satisfied, by determining one or more of a location of a terminal device, a current time, or an operation performed by a user on the terminal device satisfy the first interface switching condition.

16. The apparatus according to claim 15, wherein there are a plurality of different display interfaces associated with virtual user information, and the second display interface is selected from among the plurality of different display interfaces based on at least one of: (1) the location of the terminal device compared to one or more predetermined locations, or (2) the current time compared to one or more predetermined time periods.

17. The apparatus according to claim 11, further comprising: a second condition determinator, executing on at least one processor, configured to determine whether or not a second interface switching condition is satisfied in a case where the second display interface of the application is being displayed; and a second interface switcher, executing on at least one processor, configured to switch the second display interface being displayed at present to the first display interface in a case where the second interface switching condition is satisfied.

18. The apparatus of claim 17, wherein a first user interaction is used for determining whether or not the first interface switching condition is satisfied, and a second user interaction is used for determining whether or not the second interface switching condition is satisfied, and a location of the first user interaction on a screen of a terminal device is substantially identical to a location of the second user interaction on the screen of the terminal device.

19. The apparatus of claim 11, wherein an operation that receives user input is used for determining whether or not the first interface switching condition is satisfied, and the operation includes at least one of: sensing a gesture input associated with predetermined icon in proximity to an edge of the first display interface, or recognizing a voice input.

20. The apparatus of claim 11, further comprising: circuitry configured to receive input selecting a first operation from a group of multiple possible operations, and circuitry configured to set the first operation to be used for determining whether or not the first interface switching condition is satisfied.

21. An apparatus for controlling interface display, said apparatus comprising:
a processor and a memory,
wherein the memory stores computer-readable instructions that, when executed by the processor, cause the processor to execute an application that carries out the steps of:
obtaining authentic information about a user of the application,
generating a first display interface,
by removing or modifying parameters from the authentic information, generating virtual information about the user,
generating a second display interface,
while the first display interface is being displayed, determining whether or not a first interface switching condition is satisfied,
while the first interface switching condition is not satisfied, maintaining the display of the first display interface, and
when the first switching condition is satisfied, switching the first display interface to the second display interface,
wherein the first display interface is associated with the authentic user information and the second display interface is associated with the virtual user information.

* * * * *